United States Patent
Xu et al.

(10) Patent No.: US 9,928,246 B1
(45) Date of Patent: Mar. 27, 2018

(54) MANAGING SNAPSHOTS OF DATA

(71) Applicant: EMC Corporation, Hopkinton, MA (US)

(72) Inventors: Yan Xu, Boston, MA (US); Nagapraveen Veeravenkata Seela, Cary, NC (US); Michael Christopher Brundage, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 238 days.

(21) Appl. No.: 14/230,972

(22) Filed: Mar. 31, 2014

(51) Int. Cl.
*G06F 17/30* (2006.01)

(52) U.S. Cl.
CPC .... *G06F 17/30088* (2013.01); *G06F 2201/84* (2013.01)

(58) Field of Classification Search
CPC combination set(s) only.
See application file for complete search history.

(56) References Cited

U.S. PATENT DOCUMENTS

| | | | |
|---|---|---|---|
| 8,352,431 B1 * | 1/2013 | Protopopov | G06F 17/30082 707/640 |
| 9,189,490 B2 * | 11/2015 | Keller | G06F 12/16 |
| 9,207,881 B1 * | 12/2015 | Haase | G06F 3/0689 |
| 2008/0126773 A1 * | 5/2008 | Martinez | G06F 21/57 713/1 |
| 2015/0186217 A1 * | 7/2015 | Eslami Sarab | G06F 11/1446 707/649 |

* cited by examiner

*Primary Examiner* — Shyue Jiunn Hwa
(74) *Attorney, Agent, or Firm* — Krishnendu Gupta; Deepika Bhayana

(57) ABSTRACT

A method is used in managing snapshots of data. Identity information of a snapshot of data is updated. The snapshot represents a state of the data at a particular prior point in time. A new snapshot of the data is created. The new snapshot is created based on the identity information of the snapshot.

16 Claims, 6 Drawing Sheets

MANAGING SNAPSHOTS OF DATA

BACKGROUND

Technical Field

This application relates to managing snapshots of data.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A traditional storage array (herein also referred to as a "data storage system", "disk storage array", "disk array", or simply "array") is a collection of hard disk drives operating together logically as a unified storage device. Storage arrays are designed to store large quantities of data. Storage arrays typically include one or more storage array processors (SPs), for handling requests for allocation and input/output (I/O) requests. An SP is the controller for and primary interface to the storage array.

A storage array may be thought of as a system for managing a large amount of a resource, i.e., a large number of disk drives. Management of the resource may include allocation of a portion of the resource in response to allocation requests. In the storage array example, portions of the storage array may be allocated to, i.e., exclusively used by, entities that request such allocation.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Computer data is vital to today's organizations, and a significant part of protection against disasters is focused on data protection. Conventional data protection systems use data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

SUMMARY OF THE INVENTION

A method is used in managing snapshots of data. Identity information of a snapshot of data is updated. The snapshot represents a state of the data at a particular prior point in time. A new snapshot of the data is created. The new snapshot is created based on the identity information of the snapshot.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
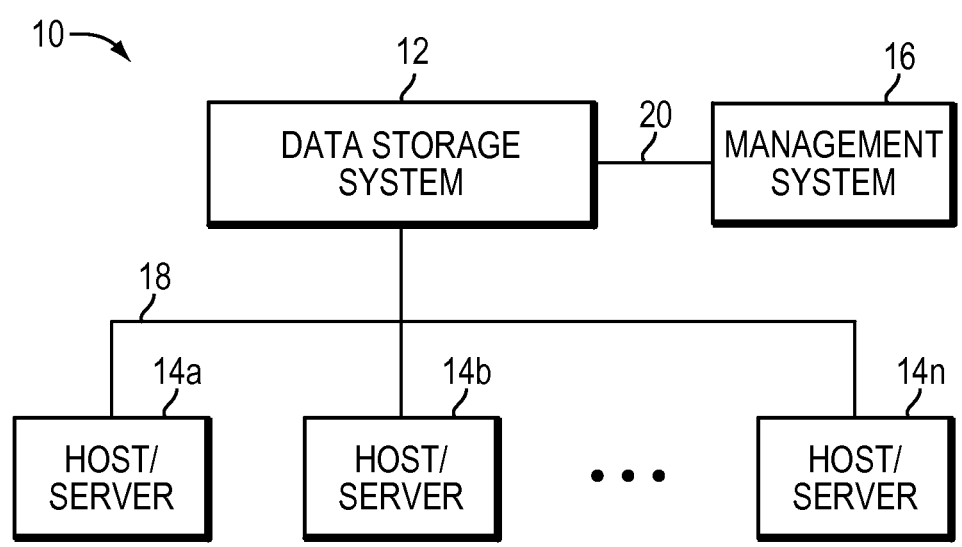
FIGS. 1-2 are examples of an embodiment of a computer system that may utilize the techniques described herein.

Described below is a technique for use in managing snapshots of data, which technique may be used to provide, among other things, updating an identity information of a snapshot of data, where the snapshot represents a state of the data at a particular prior point in time, and creating a new snapshot of the data, where the new snapshot is created based on the identity information of the snapshot.

A snapshot (also referred to herein as "replica", "checkpoint", and "snap") is a point-in-time copy of data (e.g., a production file). Generally, storage applications use snapshots to protect production data and ensure consistency of the production data. Generally, snapshots of data are created at a regular time interval. Further, a snapshot of a production data may become obsolete when new snapshots of the production data are created. Each snapshot of data has a unique identification. An old snapshot may be refreshed by reusing identification of the old snapshot. A refresh of an existing snapshot may include deleting the existing snapshot and creating a new snapshot. A snapshot management utility may refresh an existing snapshot and provide efficient reuse of the namespace of the existing snapshot by combining the operations for deleting the existing snapshot and creating a new snapshot into a single operation and preserving metadata information of the existing snapshot such as snapshot properties.

A snapshot management utility of a storage system provides a capability to refresh a snapshot of data. Conventionally, refreshing a snapshot (e.g., a snapshot file system) of data (e.g., a production file system) includes the following steps. First, in such a conventional system, refreshing a snapshot file system representing a snapshot of a production file system includes freezing the snapshot file system by suspending activities and access on the snapshot file system. Next, in such a conventional system, the production file system is also paused by suspending access to the production file system. Further, in such a conventional system, the snapshot file system which is being refreshed is then deleted. Further, in such a conventional system, a new snapshot file system is created by incrementing a generation count. Then, in such a conventional system, access to the production file system is resumed and the new snapshot file system is mounted. However, in such a conventional system, if the old snapshot file system fails to get deleted before the new snapshot file system is created, the refresh of the old snapshot file system fails. Further, in such a conventional system, if the old snapshot file system which is being refreshed is deleted but the new snapshot file system fails to get created, the refresh of the old snapshot file system fails. Further, in such a conventional system, when the old snapshot file system is deleted and the new snapshot file system fails to get created, a user may not be able to access the old snapshot that has been deleted. In such a conventional system, upon encountering such error, a storage system may need to maintain information regarding the old snapshot file system in order to retrieve the old snapshot file system and retry the refresh operation at a later time. Consequently, in such a conventional system, failure of a delete snapshot operation causes a refresh snapshot operation to fail as well. Further, in such a conventional system, a storage system may need to perform additional processing and store additional information to recognize that a previous operation for a snapshot has been failed resulting into an inconsistent internal state for the snapshot. Further, in such a conventional system, a storage system is required to maintain a database regarding various snapshots of data that have been created in order to provide information regarding an old snapshot to a user when the state of the old snapshot becomes inconsistent.

By contrast, in at least some implementations in accordance with the technique as described herein, the current technique refreshes an existing snapshot of data by renaming the existing snapshot to a different name (e.g., appending the text "DestroyByRefresh_" to the original name of the existing snapshot), setting the expiration time for the existing snapshot to a specific time (e.g., 5 minutes) past the current time, creating a new snapshot with the same as the name of the existing snapshot, and deleting the existing snapshot. Thus, in at least some implementations in accordance with the current technique, a snapshot refresh operation to refresh an existing snapshot focuses on creating a new snapshot than deleting the existing snapshot. Thus, in at least some implementations in accordance with the current technique, when a snapshot refresh operation to create a new snapshot fails, the existing snapshot may recover its original name before providing the status of the snapshot refresh operation to a user. Further, in at least some implementations in accordance with the current technique, during refresh of an existing snapshot, if a snapshot operation to create a new snapshot is successful in creating the new snapshot but a snapshot operation to delete the existing snapshot fails, refresh of the existing snapshot is considered successful and a user is able to use the new snapshot even though the existing snapshot has not been deleted yet. In such a situation, the existing snapshot may be deleted at a later time by a cleanup process that may run in background. In such a case, the cleanup process may periodically perform processing for deleting existing snapshots that have been renamed and expired. Thus, in at least some implementations in accordance with the current technique, when the refresh of a snapshot successfully completes, a new snapshot is ready for use even when the old snapshot fails to get deleted. Further, in at least some implementations in accordance with the current technique, when the refresh of an old snapshot fails to refresh the old snapshot, the old snapshot may revert back to its original state as it exists before the refresh operation and a storage system is able to provide access to the old snapshot without having to manage additional information regarding the old snapshot.

In at least some implementations in accordance with the current technique as described herein, the use of the managing snapshots of data technique can provide one or more of the following advantages: improving efficiency of a data storage system by efficiently managing refresh of snapshots of data, improving performance of a refresh snapshot process by successfully completing the refresh process even when an old snapshot fails to get deleted, improving efficiency of a refresh snapshot process by avoiding performing extra processing and to identify whether the previous refresh operation has deleted the old snapshot and whether the old snapshot is in an inconsistent state, and improving efficiency of a refresh snapshot process by avoiding storing additional information about snapshots.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
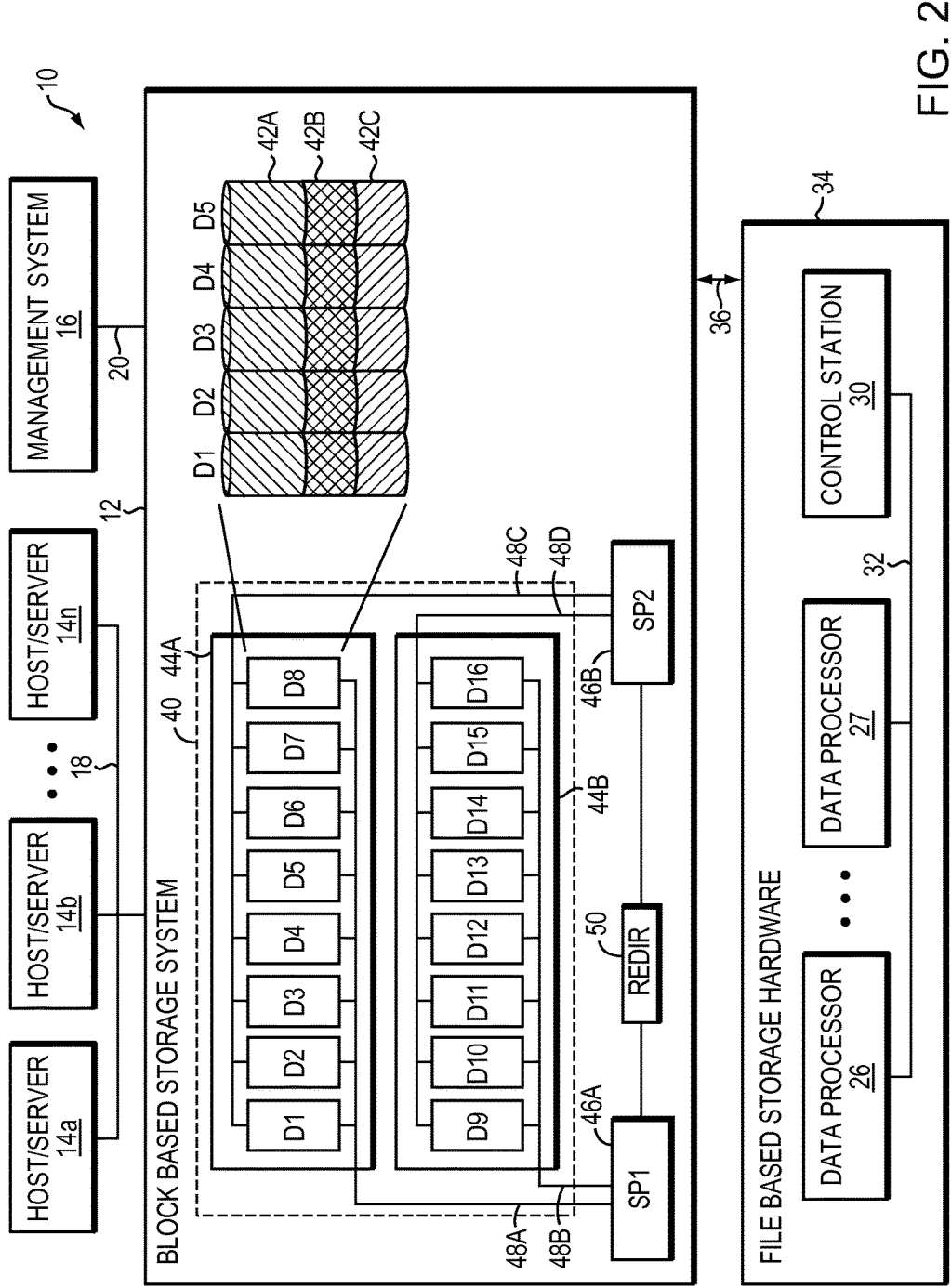

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 1, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 2, is for illustrative purposes only, and is not considered a limitation of the current technique described herein.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 1, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Figure 3:
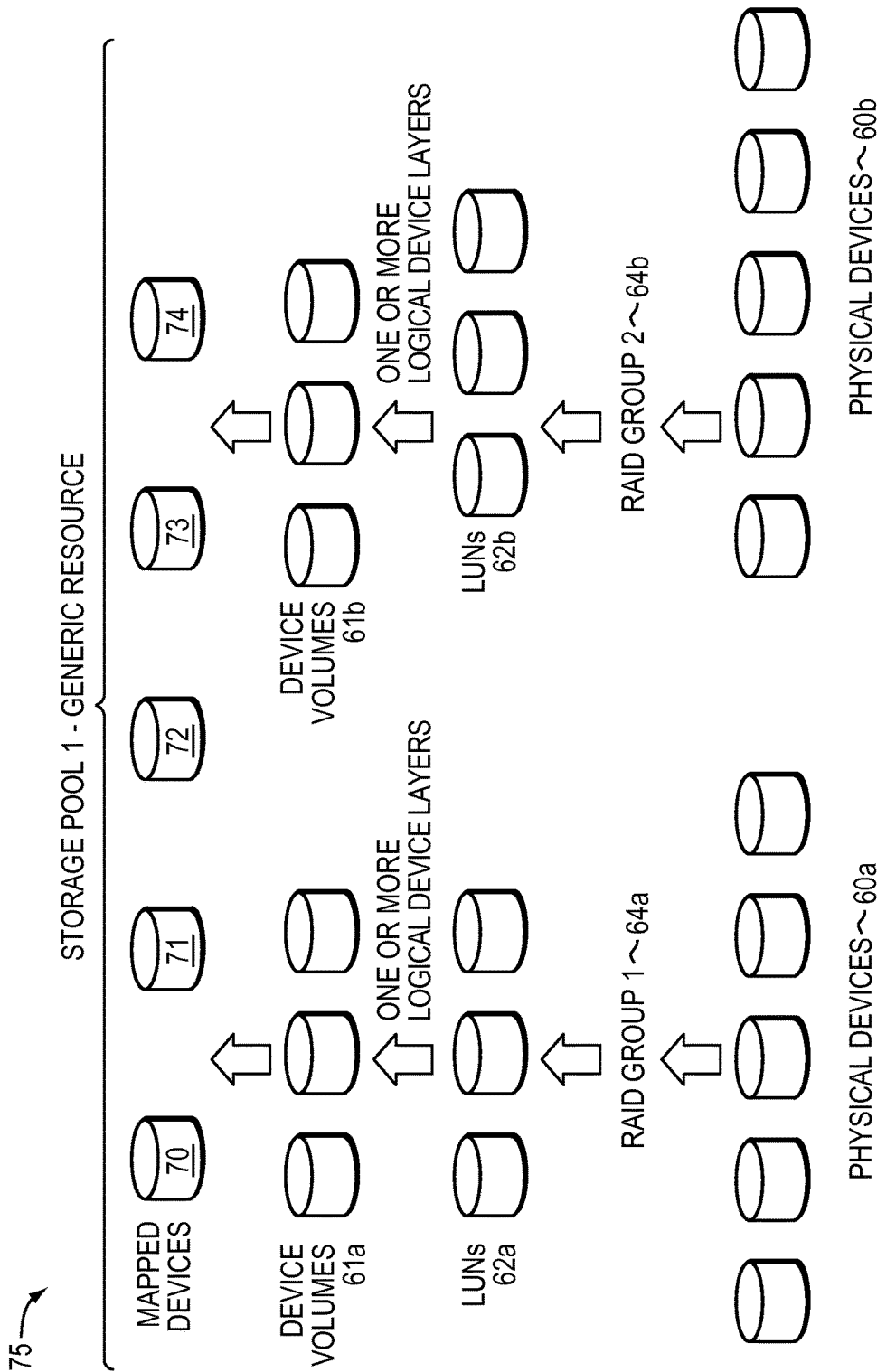
FIG. 3 is an example illustrating storage device layout.

Referring to FIG. 3, shown is an example representing how data storage system best practices may be used to form storage pools. The example 75 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 75 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space.

Generally, designs of block-based and file-based data storage systems often follow parallel paths. Further, many of the features provided by block-based storage, such as replication, snaps, de-duplication, migration, failover, and non-disruptive upgrade, are similar to features provided for file-based data storage systems. For user convenience, block-based and file-based storage systems are sometimes co-located, essentially side-by-side, to allow processing of both block-based and file-based host IOs in a single combined system as illustrated in FIG. 2. Alternatively, both block-based and file-based functionality may be combined in an unified data path architecture. The unified data path architecture brings together IO processing of block-based storage systems and file-based storage systems by expressing both block-based objects and file-based objects in the form of files. These files are parts of an underlying, internal set of file systems, which is stored on a set of storage units served by a storage pool. Because both block-based objects and file-based objects are expressed as files, a common set of services can be applied across block-based and file-based objects for numerous operations, such as replication, snaps, de-duplication, migration, failover, non-disruptive upgrade, and/or many other services, as these services are performed similarly for both block and file objects on the same underlying type of object—a file. Further, the unified data path architecture increases storage utilization by reallocating storage resources once allocated to block-based storage to file-based storage, and vice-versa. As block-based objects (e.g., LUNs, block-based vVols, and so forth) and file-based objects (e.g., file systems, file-based vVols, VMDKs, VHDs, and so forth) are expressed as underlying files, storage units released by any underlying file or files can be reused by any other underlying file or files, regardless of whether the files represent block-based objects or file-based objects. Additional details regarding the unified data path architecture is described in U.S. patent application Ser. No. 13/828,322 for "Unified DataPath Architecture", filed Mar. 14, 2013, the contents and teachings of which are hereby incorporated by reference in their entirety.

In at least one embodiment of the current technique, the unified data path architecture requires a file system to be hosted on a mapped LUN as a file system on a file. A snapshot feature provides protection for both file and block based applications.

Generally, a storage resource is an object that can be provisioned by a user. A host accesses a storage resource and data protection for the storage resource is provided by a data storage system. A virtual disk is a block storage object which is created using a storage resource. Further, a virtual disk may also be considered as a logical LUN.

Further, a snapshot is the state of a logical object such as a storage resource, an application, a virtual disk, a file system, and a mapped LUN at a particular point in time. Thus, a snap of data indicates a point in time copy of the data. A snapshot feature (e.g., Snapsure in EMC data storage system) provides capability to create snapshots for both file and block based storage resources. Further, the snapshot feature provides capabilities for creating, deleting, restoring or refreshing a checkpoint of a file system where the checkpoint of the file system is a point in time copy of the file system.

Generally, it is desirable to copy or replicate data for a variety of different reasons, such as, for example, database-related data may be critical to a business so it is important to make sure is not lost due to problems with the computer systems, such as for example, loss of electrical power. Some systems only copy, replicate, or back up data that has changed since the last such operation and this is known as incremental copying, replicating, or backup.

For mission-critical applications requiring high availability of stored data, various methods for enhancing data reliability are typically employed. One such method is to provide a "mirror" for each storage device. In a mirror arrangement, data are written to at least two storage devices. Thus, data may be read from either of the two storage devices so long as the two devices are operational and contain the same data.

In general, copying data from a first location (e.g., including one or more data volumes) to a second may be done for a myriad of reasons, including replication and backup/versioning. In a replication operation, a data set may be copied from the first location to the second to ensure that the second is a mirror of the first and that each stores a copy of the data set such that if there is a failure that results in the data set being in accessible from the first location, the second is available for access.

One illustrative method for forming a point in time copy of a data set is referred to as a snapshot and is described in detail in U.S. Pat. No. 6,792,518 to Armangau et al., which is incorporated herein by reference in its entirety.

A snapshot does not replicate a full copy of the data set (referred to as a production data set). Rather, the snapshot only stores differences between a current version of the production data set and the version of the data set at the point in time when the snapshot was taken. Multiple snapshots can also be created at different times, and can work together so that only the most recently created snapshot directly tracks changes to the production data set.

As should be appreciated from the foregoing, snapshots can be used to determine previous states of a data set at past times without needing to make a full copy of the data set at those past times. Instead, only the "deltas" or differences are stored in snapshots. Snapshot copies are in widespread use for on-line data backup. If a file becomes corrupted, the file is restored with its most recent snapshot copy that has not been corrupted.

A data storage system may be considered a source or local system and replication, backup, or other copying may be performed to a target or remote system. The term remote as used herein means being on a different storage system, although source and target systems may actually be the same system but the data may be sent to a different storage device or even a different location on the same storage device in the same system. A remote system may include storage devices (e.g. hard drives) that may function to duplicate or simulate some or all of the local system on a volume-by-volume basis and that the volumes can by physical volumes or logical volumes. Devices and volumes in a logical sense are also used interchangeably throughout. With further regard to terminology, copying is used throughout to generally refer to any way of duplicating data that is stored in one storage location (e.g. production data on the source or local system) to another storage location (e.g. data copy on the target or remote system) for any reason including, replication, backup, restore, or general mirroring.

In general, in replication processes, two or more data sets are maintained in a mirrored state such that there is a redundant copy of the data stored in the data set. A replication process may be synchronous (i.e., data is stored to the mirror as it is committed to the production data set) or asynchronous. Asynchronous replication volumes may therefore be a few seconds, minutes, or even hours out of sync with the data volume, according to the particular replication processes implemented.

In some illustrative embodiments described below, the data set for which a snapshot is taken to support replication is a logical unit mapped to a file system and the data units therefore are referred to as data blocks that are allocated to the file system. In addition, the level of data units that are tracked as being changed need not correspond to data blocks, but can be any suitable data unit. Similarly, it should be appreciated that the embodiments of the technique described herein are not limited to use with a snapshot facility that employs particular data structures identified as a block or data unit, and can be used with snapshot facilities that employ any suitable type of data structure or structures. In some implementations, a snapshot may be adapted to be used only by replication processes, and as such may only store information which is to be used by a replication process. However, in accordance with other embodiments of the technique, a snapshot that is used by a backup/versioning process or any other data copying operation may also be used to support a replication process, and accordingly the snapshot may store information usable by both types of processes.

Further, a "snapshot" is any suitable collection of data structures that creates a point in time copy of a data set and store information relating to changes made to one or more data sets. A snapshot may be associated with a point in time—for example, the time it was created or applied—and adapted to store information regarding changes made to a data set after that point in time. The data set for the snapshot may be specified in any suitable manner, including by specifying some collection of logically related storage objects (e.g., a file system or database), one or more volumes of storage, or in any other suitable manner.

Figure 4A:
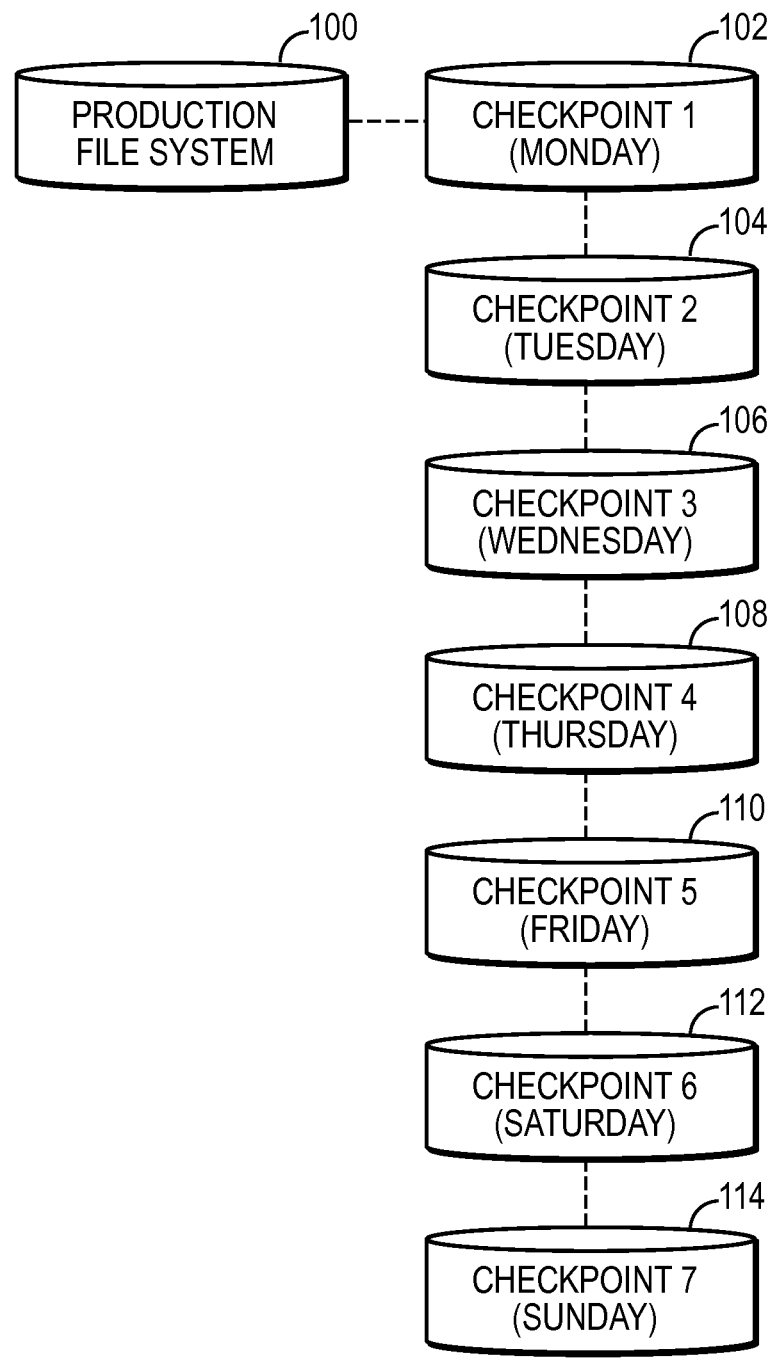
FIGS. 4A, 4B are block diagrams illustrating in more detail components that may be used in connection with techniques herein.
Figure 4B:
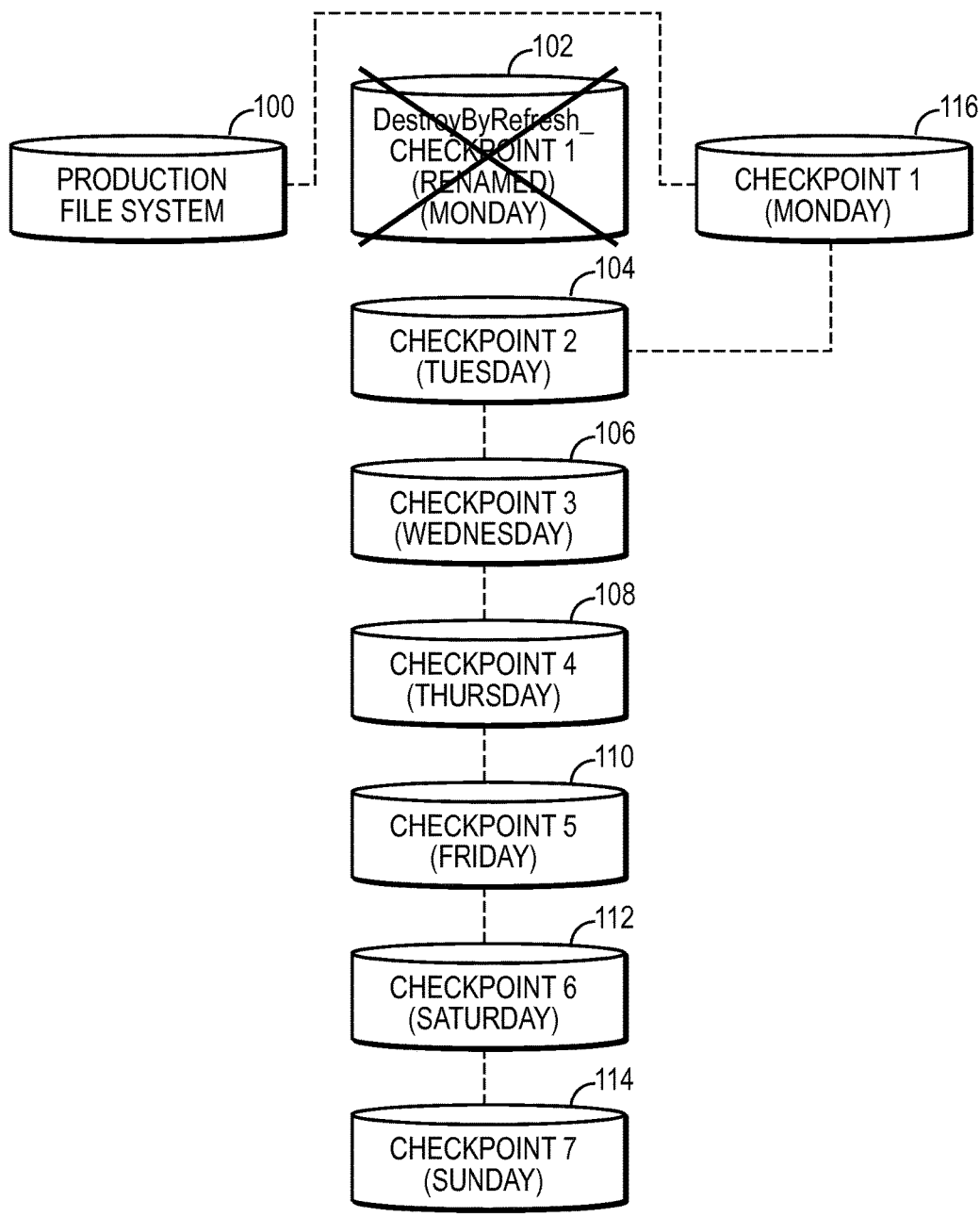

Referring to FIGS. 4A and 4B, shown are more detailed examples of an embodiment of a computer system that may be used in connection with performing the techniques described herein. Typically, snapshots of file systems are created periodically for providing data protection and creating historical references of the file systems. Generally, a file based storage system stores a set of production file systems (also referred to herein as "primary file system" or "PFS") and a set of snapshot file systems ("SFS"), each SFS representing a snapshot of a PFS at a particular point in time. Typically, each PFS 42 is associated with a set of SFSs. For example, each PFS may be associated with 256 SFSs, representing 256 snapshots of that PFS taken every 12 hours over the past 128 days. The sharing relationships between the PFSs and SFSs may be represented as detailed in U.S. Pat. No. 8,032,498, the contents and teachings of which are incorporated herein in their entirety by this reference.

In at least one embodiment of the current technique, data storage system 12 stores a set of container file systems (not depicted), each of which contains one PFS and its associated SFSs. In at least one embodiment, each container file system is a file. In at least some embodiments, each PFS and SFS is a file. Each SFS also represents a file system structure, containing a root directory, various directories and subdirectories, and various files. Many of these directories, subdirectories, and files correspond to the directories, subdirectories, and files of the associated PFS, but, since directories, subdirectories, and files may be created and deleted over time, it is possible that they do not exactly correspond.

For example, as shown in FIG. 4A, PFS 100 is associated with seven SFSs 102, 104, 106, 108, 110, 112, and 114, each SFS representing a snapshot created on a daily basis in a specific week. Any one of the SFSs may be refreshed by reusing the namespace of that SFS.

A snap refresh operation is a combination of a delete snap operation and a create snap operation. The new snap created by a snap refresh operation performed on an old snap retains some of the user visible properties of the old snap such as name and description and regenerates one or more metadata information such as object identification number for the new snap. A snap refresh operation includes synchronous and asynchronous processing. If a snap refresh synchronous processing is performed synchronously on an existing snap, a new snap is created with the same name as the existing snap and the existing snap is renamed to a different name such as appending the name with "DestroyByRefresh" and set with an expiration time. The asynchronous snap processing includes making the new snap available for use and deleting the existing snap. If an error is encountered during asynchronous processing, the existing snap may need to be deleted manually at a later point in time or may be deleted by a background process which deletes expired snapshots.

In at least one embodiment of the current technique, refreshing a snapshot of data (such as a file system) includes renaming the snapshot to a different name, creating a new snapshot with the same name as the original name of the renamed snapshot and destroying the renamed snapshot.

Thus, for example, as shown in FIG. 4B, checkpoint-1 102 is refreshed by first renaming the checkpoint-1 to "DestroyByRefresh_Checkpoint-1", creating a new snapshot with the name "Checkpoint-1" 116, and deleting "DestroyByRefresh_Checkpoint-1" 102.

Thus, in at least one embodiment of the current technique, in contrast with a conventional snap refresh operation, a snap refresh operation using the current technique does not destroy the old snapshot before creating a new snapshot. As a result, in at least one embodiment of the current technique, as soon as the new snapshot is created, the new snapshot may be used by a user or an application without having to wait for the old snapshot to get deleted.

Further, in at least one embodiment of the current technique, if an error occurs during creation of the new snapshot, appropriate cleanup procedure may be performed such that the old snapshot may be accessible to a user and/or an application. Further, any error that may occur when deleting an old snapshot may be ignored as a user may continue using the new snapshot. Further, in such a case, the old snapshot may be deleted at a later point in time.

Figure 5:
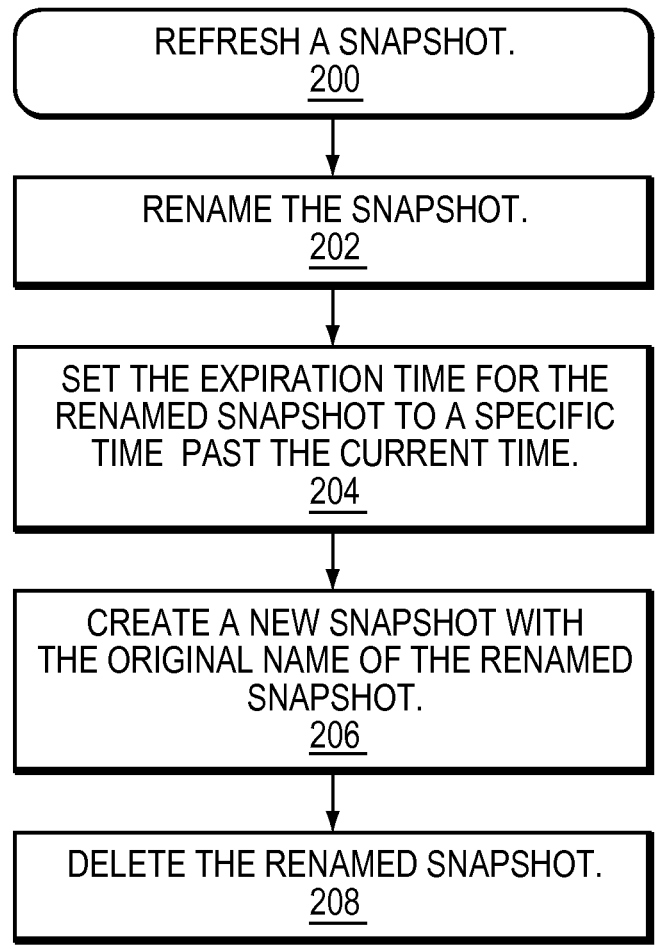
FIG. 5 is a flow diagram illustrating processes that may be used in connection with techniques herein.

Referring to FIG. 5, shown is a more detailed flow diagram illustrating managing snapshots of data. With reference also to FIGS. 1-4, in at least one embodiment of the current technique, a snapshot is refreshed by reusing the namespace of the snapshot (step 200). First the snapshot is renamed to a different name (step 202). The expiration time for the renamed snapshot is set to a specific time (e.g., 5 minutes) past the current time (step 204). A new snapshot is created with the original name of the renamed snapshot (step 206). The renamed snapshot is then deleted (step 208).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing snapshots of data, the method comprising:
   receiving a request to refresh a previous snapshot of data stored on a storage system, wherein the previous snapshot represents a state of the data at a particular prior point in time, wherein the storage system stores the data and a set of snapshots of the data;
   updating a user visible information of the previous snapshot of the data, wherein updating the user visible information of the previous snapshot includes changing a name of the previous snapshot to a different name, wherein the user visible information of a snapshot includes a name of the snapshot and an object identification number for the snapshot;
   setting a deletion time for the previous snapshot of the data;
   creating a new snapshot of the data on the storage system, wherein the new snapshot of the data represents a state of the data at another particular point in time, wherein the new snapshot is created based on the user visible identity information of the previous snapshot, wherein the new snapshot is created with a same name as the name of the previous snapshot;
   providing access to the new snapshot indicating completion of the request to refresh the previous snapshot without having to wait for the previous snapshot to be deleted; and
   deleting the previous snapshot asynchronously by a background process at the occurrence of the deletion time, wherein the background process executes periodically on the storage system to delete snapshots that have been renamed and identified for deletion.

2. The method of claim 1, wherein the new snapshot is created based on the user visible information of the previous snapshot upon receiving the request to refresh the previous snapshot.

3. The method of claim 1, wherein the user visible information of the previous snapshot includes the name of the previous snapshot.

4. The method of claim 1, thither comprising:
   reverting the user visible information of the previous snapshot upon receiving an error when creating the new snapshot.

5. The method of claim 1, wherein the data includes a file system.

6. The method of claim 1, wherein the data resides on a storage system, wherein the storage system includes a disk drive system comprising a plurality of Redundant Array of Inexpensive Disks (RAID) systems, each RAID system of the plurality of RAID systems having a first disk drive and, a second disk drive.

7. The method of claim 1, wherein each snapshot of the set of snapshots is created at a specific time interval.

8. The method of claim 1, further comprising:
setting an expiration timer for the previous snapshot, wherein the previous snapshot is deleted at the end of the expiration timer.

9. A system for use in managing snapshots of data, the system comprising a processor configured to:
receive a request to refresh a previous snapshot of data stored on a storage system, wherein the previous snapshot represents a state of the data at a particular prior point in time, wherein the storage system stores the data and a set of snapshots of the data;
update a user visible information of the previous snapshot of the data, wherein updating the user visible information of the previous snapshot includes changing a name of the previous snapshot to a different name, wherein the user visible information of a snapshot includes a name of the snapshot and an object identification number for the snapshot;
set a deletion time for the previous snapshot of the data;
create a new snapshot of the data on the storage system, wherein the new snapshot of the data represents a state of the data at another particular point in time, wherein the new snapshot is created based on the user visible identity information of the previous snapshot, wherein the new snapshot is created with a same name as the name of the previous snapshot;
provide access to the new snapshot indicating completion of the request to refresh the previous snapshot without having to wait for the previous snapshot to be deleted; and
delete the previous snapshot asynchronously by a background process at the occurrence of the deletion time, wherein the background process executes periodically on the storage system to delete snapshots that have been renamed and identified for deletion.

10. The system of claim 9, wherein the new snapshot is created based on the user visible information of the previous snapshot upon receiving the request to refresh the previous snapshot.

11. The system of claim 9, wherein the user visible information of the previous snapshot includes the name of the previous snapshot.

12. The system of claim 9, further comprising:
revert the user visible information of the previous snapshot upon receiving an error when creating the new snapshot.

13. The system of claim 9, wherein the data includes a file system.

14. The system of claim 9, wherein the data resides on a storage system, wherein the storage system includes a disk drive system comprising a plurality of Redundant Array of Inexpensive Disks (RAID) systems, each RAID system of the plurality of RAID systems having a first disk drive and a second disk drive.

15. The system of claim 9, wherein each snapshot of the set of snapshots is created at a specific time interval.

16. The system of claim 9, further comprising:
set an expiration timer for the previous snapshot, wherein the previous snapshot is deleted at the end of the expiration timer.

* * * * *